United States Patent [19]
Bae et al.

[11] Patent Number: 5,944,148
[45] Date of Patent: Aug. 31, 1999

[54] NO-BACK BRAKE

[75] Inventors: Kwan-Ho Bae, Bothell; Michael J. Cacciola, Edgewood, both of Wash.

[73] Assignee: The Boeing Company, Seattle, Wash.

[21] Appl. No.: 09/144,401

[22] Filed: Aug. 31, 1998

[51] Int. Cl.⁶ ...................................................... B60T 7/12

[52] U.S. Cl. ...................... 188/134; 192/223.3; 192/18 R

[58] Field of Search .................................. 188/71.1, 71.2, 188/71.5, 72.1, 72.2, 72.3, 72.7, 72.8, 134, 196; 192/18 R, 223.3

[56] References Cited

U.S. PATENT DOCUMENTS

| | | |
|---|---|---|
| 4,030,578 | 6/1977 | Cacciola et al. . |
| 4,176,733 | 12/1979 | Twickler ................................ 188/134 |
| 4,459,867 | 7/1984 | Jones . |
| 4,483,429 | 11/1984 | Tiedwan ................................ 192/18 R |
| 4,597,477 | 7/1986 | Miller .................................... 192/223.3 |
| 4,625,843 | 12/1986 | Maltby et al. . |
| 4,762,205 | 8/1988 | Ortman . |
| 4,850,458 | 7/1989 | Allan et al. . |
| 5,199,538 | 4/1993 | Fischer et al. ......................... 188/134 |
| 5,299,666 | 4/1994 | Lang et al. . |
| 5,582,390 | 12/1996 | Russ . |
| 5,655,636 | 8/1997 | Lang et al. . |

*Primary Examiner*—Chris Schwartz
*Attorney, Agent, or Firm*—Christensen O'Connor Johnson & Kindness PLLC

[57] ABSTRACT

Cooperating brake discs, rotors, and stators all are located at the same side of a pair of cam plate flanges. The cam plate flanges are coupled to an inner sleeve and input gear, respectively, with balls and ball ramp sockets for forcing apart the cam plate flanges when an output side is driven relative to an input side. The brake is effective to prevent relative rotation of the output side relative to the input side, but is released by rotation of an input gear for driving the inner sleeve.

9 Claims, 9 Drawing Sheets

NO-BACK BRAKE

FIELD OF THE INVENTION

The present invention relates to a no-back brake, particularly a no-back brake used as the secondary brake in an aircraft horizontal stabilizer trim actuator.

BACKGROUND OF THE INVENTION

Modern commercial aircraft have horizontal stabilizers that pivot relative to the airplane fuselage to "trim" the aircraft during flight. This involves adjusting the position of the horizontal stabilizer, to accommodate for different load distributions within the aircraft, for example. One common horizontal stabilizer trim actuator consists of a ball nut mounted in a gimbal at the leading edge of the center of the horizontal stabilizer structure, and an upright ball screw extending through the ball nut. The ball screw, in turn, has its end remote from the ball nut mounted in a gimbal secured to the fuselage. By rotating the ball screw in one direction, the leading edge of the horizontal stabilizer is moved up, whereas by rotating the ball screw in the other direction, the leading edge of the horizontal stabilizer is moved down. Rotation of the ball screw can be by a motor and associated gearing.

The horizontal stabilizer hinge moment is transmitted through the stabilizer gimbal and ball nut to the ball screw. This load has a vertical component as well as a torque component due to ball screw lead (threads). Toward the base of the ball screw at its junction with the fuselage, a "primary" no-back device is provided to apply a braking force during trimming. Preferably, the primary no-back device provides a force resisting rotation of the ball screw in a direction that would result in movement of the stabilizer in the direction of the applied aerodynamic force (called the "aiding direction"), while applying little or no force resisting rotation of the ball screw in the direction that would result in movement of the horizontal stabilizer contrary to the direction of the applied aerodynamic force (called the "opposing direction").

In known designs, the primary no-back device is located remotely from the motor and gearing which turn the ball screw to trim the horizontal stabilizer. In the case of failure of the primary no-back device, the ball screw would be backdriven due to the aerodynamic load on the horizontal stabilizer, and an extremely dangerous condition would result. Thus, it is necessary to have a secondary brake which prevents backdriving of the ball screw in the case of failure of the primary no-back device, but which provides limited resistance to driving of the ball screw to trim the horizontal stabilizer, regardless of whether the ball screw is being driven against the force of the aerodynamic load on the horizontal stabilizer (opposing direction) or in the same direction as the force resulting from the aerodynamic load (aiding direction).

An example of a bi-directional rotary brake is shown in Allan et al. U.S. Pat. No. 4,850,458. The device shown in that patent provides a braking force preventing either a reverse load or an overrunning load from turning an output shaft. A predetermined amount of lost motion is permitted between the input shaft and an input cam plate, and an output shaft and an output cam plate. Turning of the output shaft beyond the predetermined amount of lost motion causes relative rotation of the input and output cam plates. Steel balls mounted between the input and output cam plates ride in cupped sockets or "ramps" such that the relative rotation of the input and output cam plates forces them apart. This axial motion results in a compressive force being applied at the output side of the output cam plate and at the input side of the input cam plate. In each instance the compressive force increases frictional brake forces between the cam plate and the brake housing by way of a skewed roller brake disc. Thus, if the output shaft is driven in either direction relative to the input shaft, a braking action is achieved. While having some mechanical components similar to the present invention, the device disclosed in Allan et al. is not adapted for use as a secondary brake in a horizontal stabilizer trim actuator, particularly in view of potential brake chatter and difficulty in adjusting brake gain.

Other secondary brakes in horizontal stabilizer trim actuators have used ratchet-pawl constant drag brakes which require more frequent service than desirable, somewhat inconsistent brake torque during the useful life, and potential mechanical failure, such as skipping teeth between the ratchet-pawl couplings.

SUMMARY OF THE INVENTION

The present invention provides an improved no-back brake, and specifically a no-back brake adapted for use as the secondary brake in a horizontal trim actuator, which achieves consistent brake gain, is self-energizing, and achieves smooth operation without chattering in both the aiding and opposing direction. The improved no-back brake also provides long service life from a compact brake package.

In the preferred embodiment, a non-split design is provided, with the cooperating brake discs, rotors, and stators all located at the same side of a pair of cam plate flanges. The cam plate flanges are coupled to a ball screw sleeve and input gear, respectively, with balls and ball ramp sockets for energizing the brake when an output side is driven relative to an input side. In addition, all components are mounted in an oil-filled housing, thereby reducing the possibility of contamination during use and increasing the useful life of the brake. The oil-filled housing efficiently dissipates energy as heat, which also increases the useful life of the brake.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
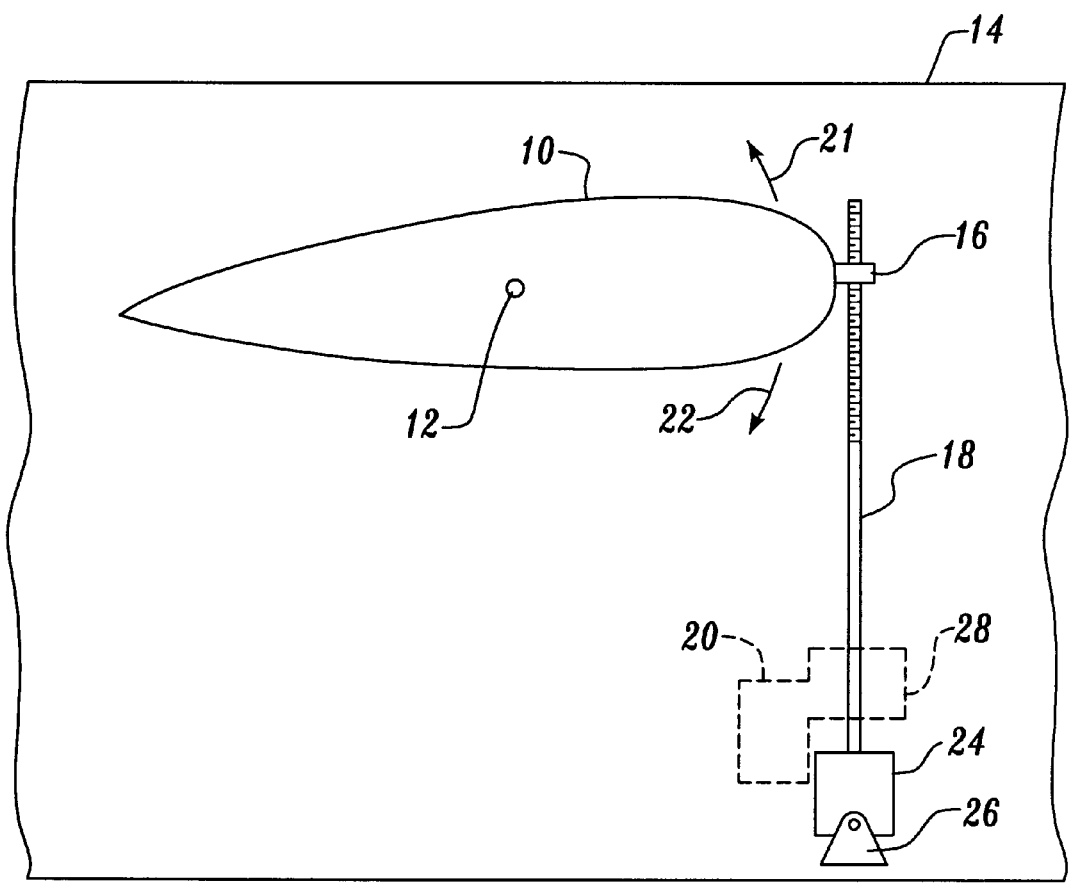
FIG. 1 is a diagrammatic side elevation of an aircraft fuselage illustrating the horizontal stabilizer trim actuator including a no-back brake in accordance with the present invention.

A representative environment for a bi-directional no-back brake in accordance with the present invention is shown in FIG. 1. The horizontal stabilizer 10 of an aircraft is swingable about a transverse horizontal axis 12 for trimming the aircraft during flight, such as based on the weight distribution of the load carried by the aircraft. Inside the tail section of the airplane fuselage 14, a gimbal and ball nut 16 receives an upright ball screw 18 which can be rotated in either direction by a suitable drive mechanism 20 such as a motor and appropriate gearing. The ball screw may extend up or down from the gimbal and ball nut 16, and is illustrated and described with reference to a downward extending ball screw, but the invention applies equally to an upward extending orientation. The horizontal stabilizer hinge moment is applied to the ball screw 18 through the gimbal and ball nut 16. This load may be upward directed as represented by the arrow 21, in which case a tensile force is applied to the lower portion of the ball screw 18, or downward directed as represented by the arrow 22, in which case a compressive force is applied to the lower portion of the ball screw. At the same time, a torque load in one direction or the other is applied to the ball screw due to the threaded interconnection with the ball nut.

At the base of the ball screw, a "primary" bi-directional no-back device 24 is provided, mounted in the airplane fuselage by a lower gimbal 26. In a representative embodiment, the primary no-back device relies on the axial loading of the ball screw to achieve a brake force application depending on whether the ball screw is driven in an opposing direction (contrary to the load resulting from the aerodynamic force on the horizontal stabilizer) or in the aiding direction (in the same direction as the load resulting from the aerodynamic force on the horizontal stabilizer). The present invention provides an improved secondary bi-directional no-back brake 28 which does not rely on the compressive-tensile load applied to the ball screw. In the case of failure of the primary no-back device, the secondary brake 28 prevents, the torque load induced by the aerodynamic forces on the horizontal stabilizer from driving the ball screw in either direction, without interfering with trimming of the horizontal stabilizer by rotation of the ball screw 18 induced by the motor 20.

Figure 2:
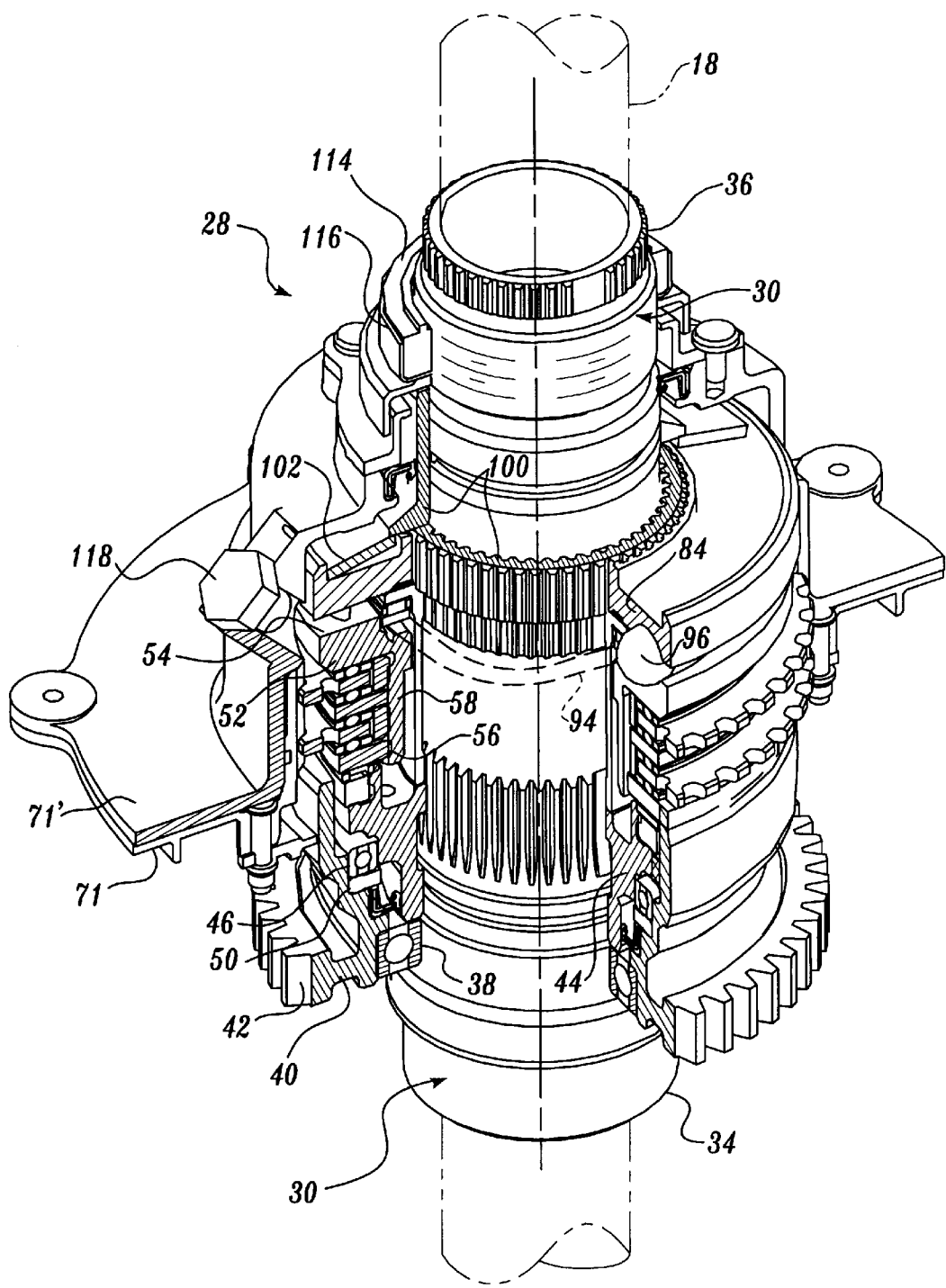
FIG. 2 is a top perspective of a no-back brake in accordance with the present invention, with parts broken away.
Figure 3:
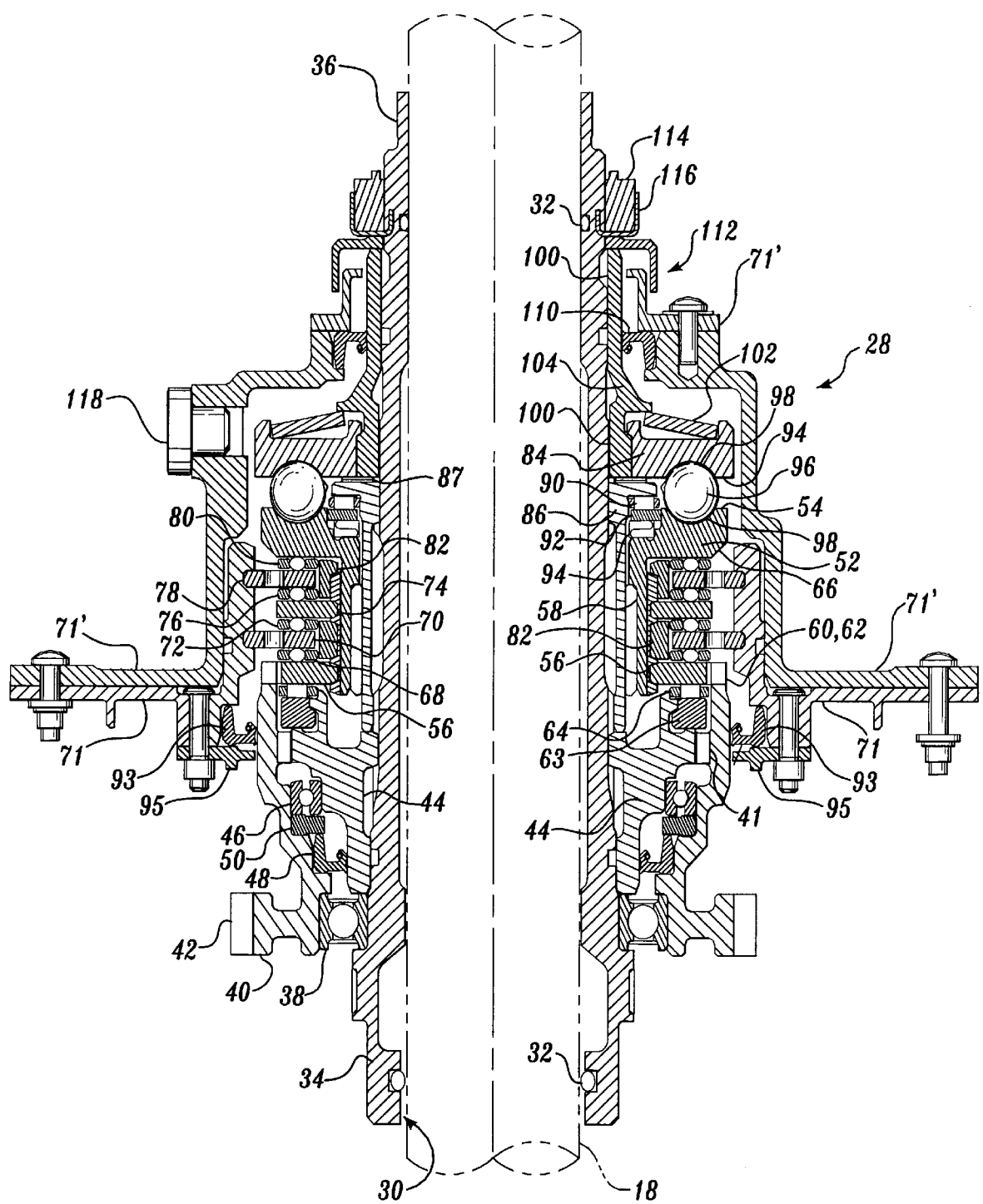
FIG. 3 is a longitudinal section through the no-back brake of FIG. 2.
Figure 4:
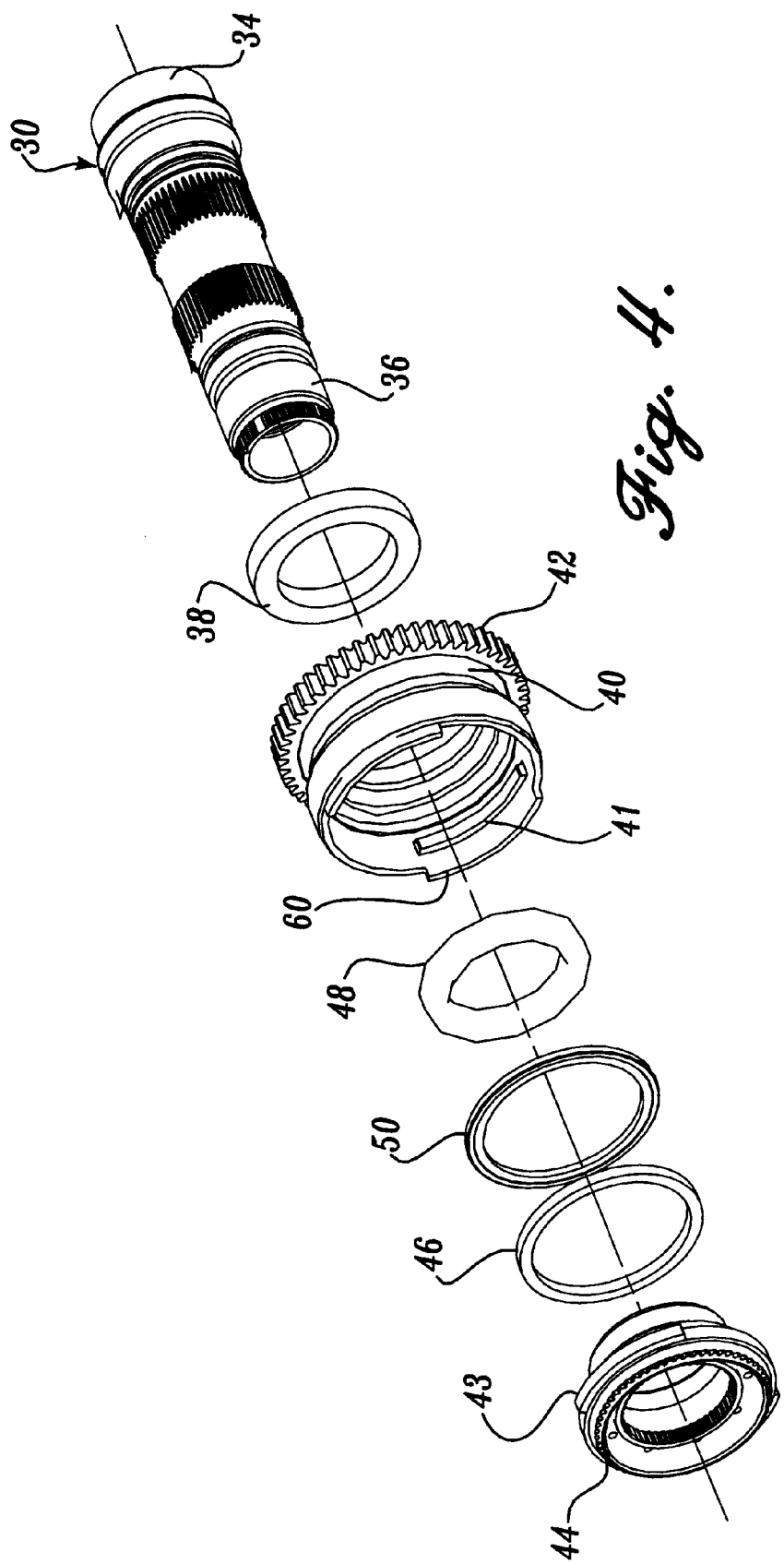
FIG. 4, FIG. 5, and FIG. 6, are perspectives of components of the no-back brake in accordance with FIGS. 2 and 3, with parts shown in exploded relationship.

With reference to FIG. 2, FIG. 3, and FIG. 4, the no-back brake 28 in accordance with the present invention includes a long internal sleeve 30 which is splined to the ball screw 18 (shown in broken lines in FIG. 2 and FIG. 3). Thus, the sleeve 30 rotates with the ball screw 18 and, unlike some other components of the device, such conjoint rotation occurs with no lost motion. As shown in FIG. 3, O-rings 32 at the input end 34 and output end 36 seal the splined central portion of the sleeve 30 and the ball screw.

At the input end 34 of the no-back brake, a ball bearing 38 supports an input gear 40 having teeth 42 which mesh with a gear train connected to the motor 20 (FIG. 1). An intermediate splined sleeve 44 is joined to sleeve 30 for conjoint rotation therewith, and is coupled to the input gear 40 by a first lost motion coupling permitting approximately 20 degrees of relative movement between the input gear 40 and the intermediate sleeve 44. Consequently, the same degree of lost motion is permitted between the input gear and the long inner sleeve 30. With reference to FIG. 4, the lost motion is achieved by the location and circumferential extent of ribs 41 at opposite sides of the hollow core of the input gear 40 and projecting short distances inward therefrom, and the spaces between aligned ribs 43 on the intermediate sleeve 44. As noted above, in a representative embodiment, the angular extent of the permitted lost motion between the input gear 40 and sleeve 44 (and consequently sleeve 30) is about 20 degrees, i.e., one component can rotate a maximum of that angle relative to the other before the coupling parts interengage and rotate together. The input gear 40 is supported on the intermediate sleeve 44 by a ball bearing 46. As best seen in FIG. 3, a seal 48 is held in place by a retainer ring 50 to prevent contamination of the interior of the input gear and the components with which it interacts.

Figure 5:
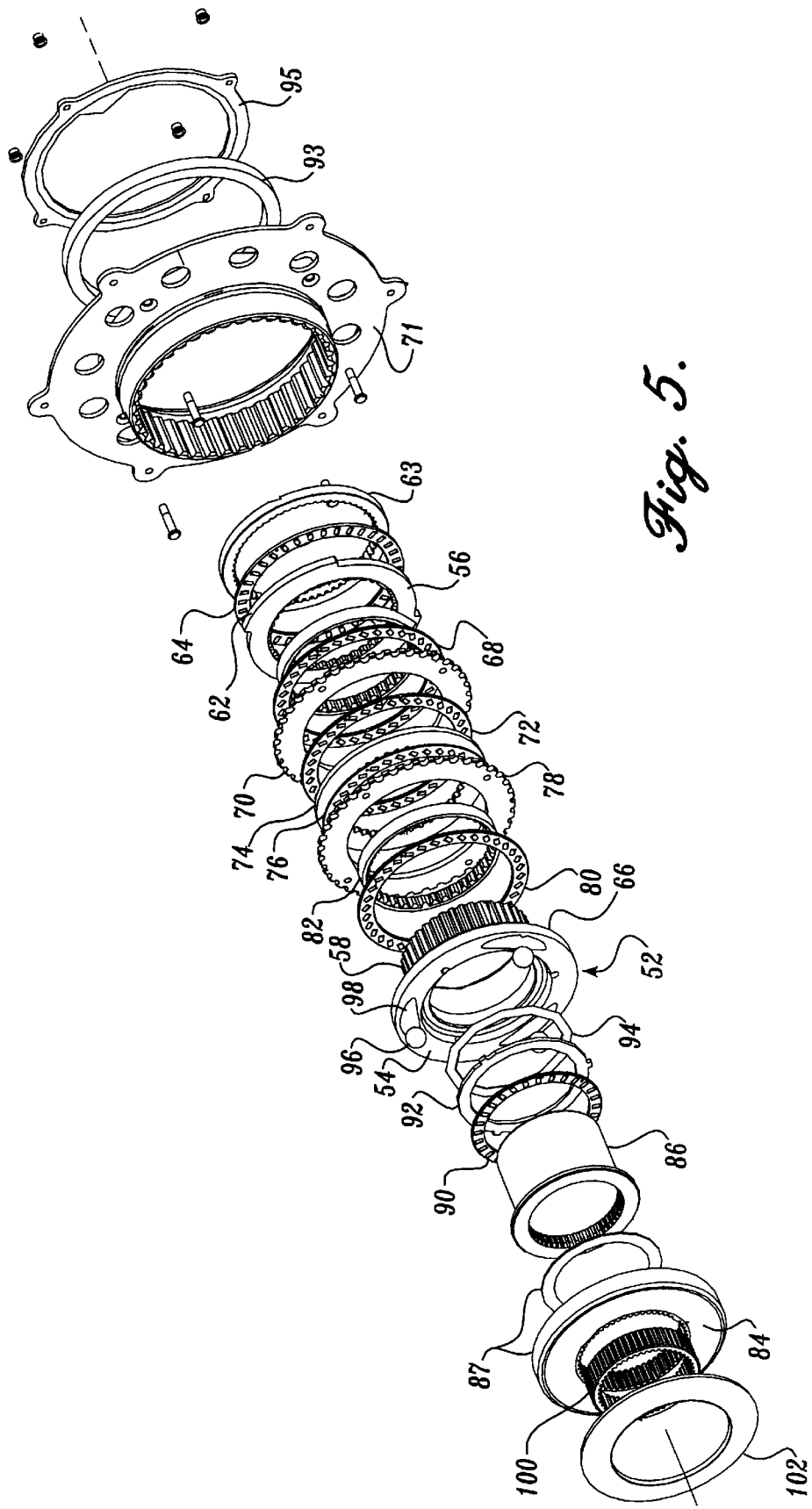
Figure 6:
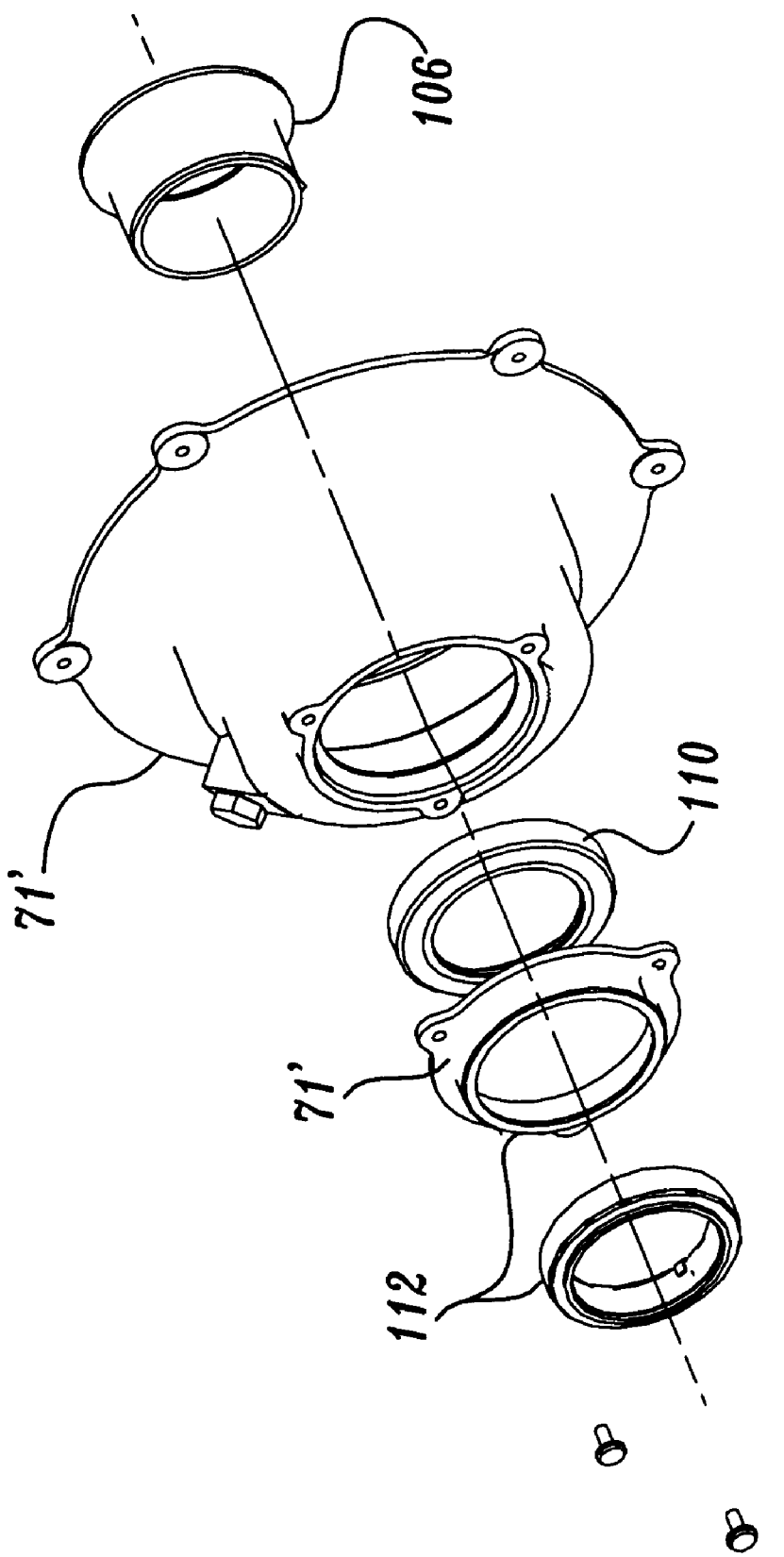

Referring to FIG. 2, FIG. 3 and FIG. 5, an input cam 52 having a cam face 54 has its input end coupled to the input gear 40 by way of an input lost motion coupling ring 56. Ring 56 has its inner portion splined to the exterior of the input cam stem 58 (for conjoint rotation) and its outer portion coupled to the input gear (for lost motion coupling). Such coupling consists of interdigitated projections 60, 62 on the input gear 40 (see FIG. 4) and coupling ring 56 (see FIG. 5), respectively, allowing for limited relative rotation of the input gear and input cam, about 20 degrees in a representative embodiment. The coupling ring 56 is held in position by a thrust plate 63 and thrust roller bearing 64 engaged between the intermediate sleeve 44 and the adjacent surface of the coupling ring 56.

Figure 7:
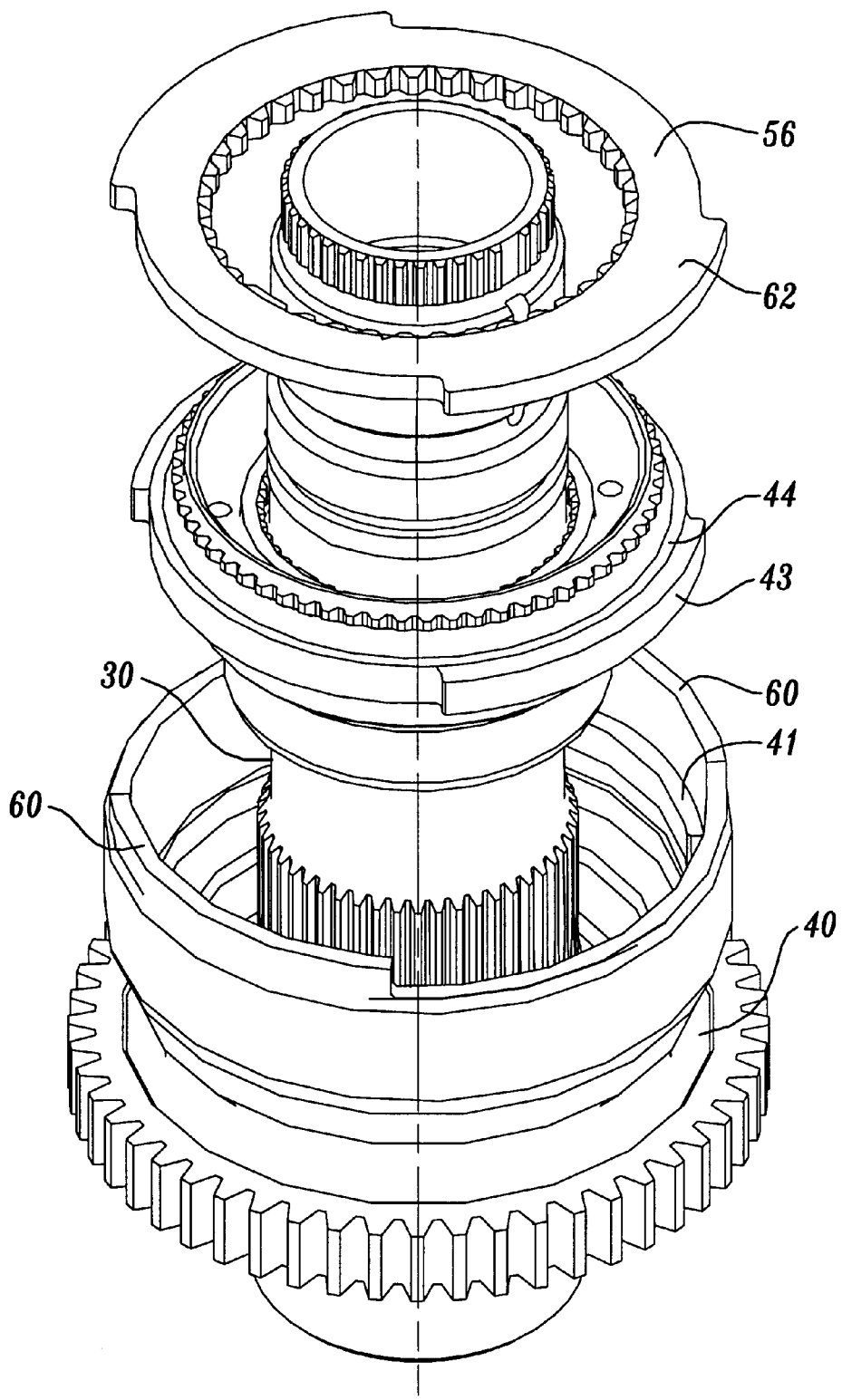
FIG. 7 is a top perspective of one set of components of the no-back brake in accordance with FIGS. 2–6, with parts shown in partially exploded relationship.

The cooperating lost motion components also are seen in FIG. 7, including: the long inner sleeve 30 which is splined to the ball screw; the input gear 40 which is rotatably mounted on the inner sleeve 30 and which has the inward extending projections 41; the intermediate sleeve 44 which is splined to the inner sleeve 30 and which has the projections 43 that fit between and cooperate with the input gear projections 41; and the coupling ring 56 which is splined to the input cam (not seen in FIG. 7) and which has the projections 62 cooperating with the projections 60 from the input gear. Thus provision is made for limited lost motion between the input gear 40 and the input cam 52 (by way of the coupling ring 56), and for limited lost motion between the input gear 40 and the ball screw 18 (by way of the intermediate sleeve 44).

With reference to FIGS. 3 and 5, a number of braking stages are interposed between the coupling ring 56 and the undersurface 66 of the input cam 52. Proceeding from the coupling ring, these components include a first skewed roller brake disc 68, stator ring 70 splined to the intermediate stator housing 71 (see FIG. 3), second skewed roller brake disc 72, rotor disc 74 splined to the input cam 52, skewed roller brake disc 76, second stator ring 78 splined to the intermediate stator housing 71 (see FIG. 3), and fourth skewed roller brake disc 80. The inner circumferential edges of the skewed roller brake discs 68, 72, 76, and 80 ride on support rings 82. During operation of the brake, progressively greater compression applied by the under surface 66 of the input cam 52 tending to squeeze these components together increases the braking force (i.e., resistance to relative turning of the inner sleeve 30 and housing 71, 71' which is stationarily mounted), and such compressive force is applied automatically by rotation of an output cam 84 relative to the input cam 52. The input cam rides on a cylindrical spacer 86 which is splined to the inner sleeve 30. A minimum spacing between the facing surfaces of the input and output cams and balls is set by adjusting shim 87 fitted between the output cam 84 and a flange of the cylindrical spacer 86. A thrust roller bearing 90, adjacent thrust plate 92 and a wave spring 94 are retained by the flange of cylindrical spacer 86 and input cam 52. As discussed in more detail below, the wave spring 94 is an important component that preloads the brake by applying an initial compressive force between the input cam 52 and the coupling ring 56. Toward the bottom of the brake, a seal 93 is provided between the lower end of the intermediate stator housing 71 and the outer periphery of the input gear 40, held in position by a retainer ring 95.

Figure 8:
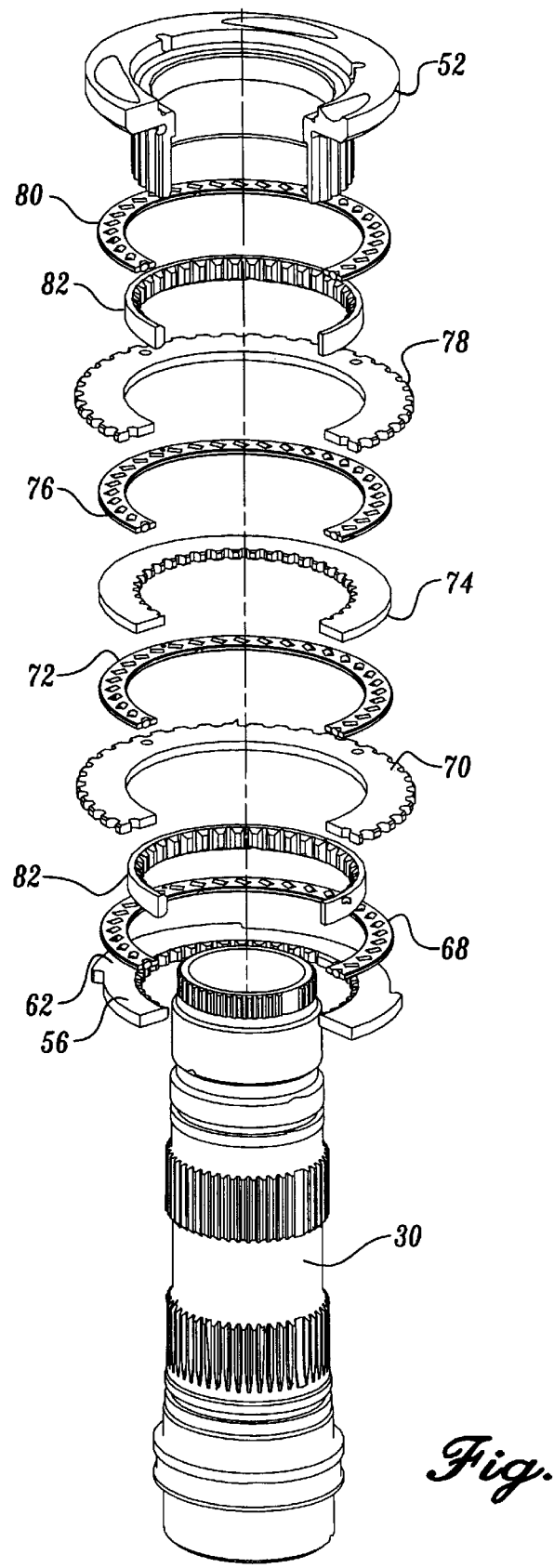
FIG. 8 is a top perspective view of another set of components of the no-back brake in accordance with FIGS. 2–6, with parts shown in exploded relationship.

The brake components are also seen in FIG. 8 including: the long inner sleeve 30 which is splined to the ball screw; skewed roller brake discs 68, 72, 76, and 80; stator rings 70 and 78 which are splined to the intermediate stator housing 71; rotor disc 74 and coupling ring 56 which are splined to the input cam 52; and support rings 82 which are rotatably received inside the central apertures of the skewed roller brake discs and the stators. FIG. 8 also shows the input cam 52. The braking force is achieved by compression between the undersurface of the input cam 52 and the upper surface of the coupling ring 56. The skew angle of the individual rollers of the brake disks 68, 72, 76, and 80, among other things, determines the coefficient of friction when the brake disks are squeezed between components rotating relative to each other, such as a brake disk between a rotor and a stator, and the brake force increases with increasing compression.

Figure 9:
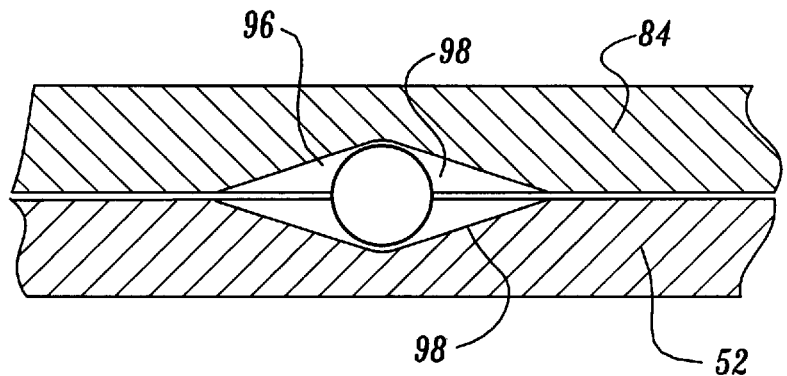
FIG. 9 is a fragmentary vertical section through cooperating parts of a no-back brake in accordance with the present invention, namely, input and output cam plates.
Figure 10:
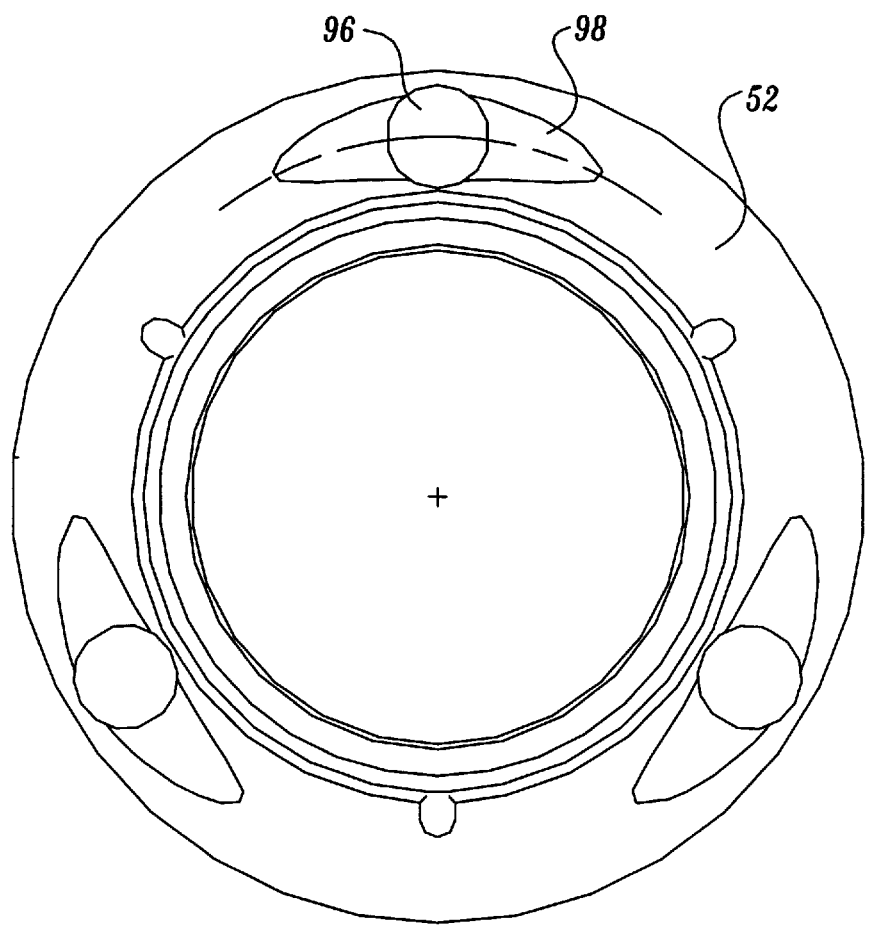
FIG. 10 is a diagrammatic plan of one of the cam plates shown in FIG. 9.

Returning to FIGS. 2, 3, and 5, particularly FIG. 3, the output cam 84 has a bottom cam surface 94 facing the top cam surface 54 of the input cam 52. A plurality of balls 96, three equi-angularly spaced balls in a representative embodiment, are interposed between the two cam surfaces. The balls ride in tapered sockets 98 which are "ramped", i.e., decrease in depth away from their centers, as seen in FIGS. 9 and 10. The result is that turning of the output cam 84 relative to the input cam 52 causes the balls 96 to ride higher in their sockets, forcing the cams apart and thereby applying greater and greater braking force through the brake stages consisting of the skewed roller brake discs, stators, and rotors.

The output cam 84 rotates with the inner sleeve 30 by way of a double-sided splined cylinder ring 100. Splined cylinder 100 extends upward from the output cam. A Belleville spring 102 is engaged between the output cam 84 and a shoulder 104 of the upper portion of the splined cylinder.

Finally, at the output end of the device, a seal 110 is engaged between the stator housing 71' and the splined cylinder 100 to prevent contamination of the internal cavity of the brake. The stator housing includes an upper telescoped end portion 112, to accommodate for the shim adjustment and necessary tolerances transferred to the location of the splined cylinder which acts as an output sleeve. With reference to FIGS. 2 and 3, a nut 114 holds the unit together (threaded on the output end of the long internal sleeve 30) and is retained in place by a cup lock washer 116. Preferably, the cavity of the brake is oil-filled, access being provided by a threaded plug 118.

Operation of the no-back brake in accordance with the present invention is as follows:

In the "at rest" condition, i.e., with no torque applied by the ball screw 18 and no torque applied to the input gear 40, the top Belleville spring 102 urges the output cam 84 downward, limited by the shim 87 and the cylindrical spacer 86 on which the shim rests (note that the bottom end of the cylindrical spacer bears against the intermediate sleeve 44, as best seen in FIG. 3). This determines the maximum downward shifted position for the output cam 84. The wave spring 94 is fitted between an inner shoulder of the input cam 52 and thrust plate 92 which engages the thrust roller bearing 90 that, in turn, engages the underside of a flange of the cylindrical spacer 86. Thus, the wave spring "preloads" the brake by urging the input cam downward slightly, putting the brake stages under compression and resulting in a slight initial brake torque resisting rotation of the rotor 74 and coupling plate 56 relative to the stators 70 and 78.

Without any other external forces being applied, if the ball screw 18 rotates in either direction, the long inner sleeve 30 rotates, along with the double-sided splined cylinder 100 and the output cam 84. Due to the limited resistance against rotation or freewheeling of the input cam 52, the output cam starts to rotate relative to the input cam, which causes the balls 96 to roll toward the ends of their sockets 98. This forces the input and output cams relatively apart. The output cam will move upward, against the modulating force applied by the Belleville spring 102, and the input cam 52 is urged downward, thereby increasing the compressive force on the multistage brake components. The greater the tendency of the ball screw to rotate, the more relative rotation of the input and output cams, and the greater the braking force applied at the input side of the no-back brake. The maximum braking force is selected to prevent freewheeling rotation of the ball screw within a predetermined torque range. A variety of factors affect the braking force, including the strength of the Belleville spring, the number of braking stages provided, the radius and skew angles of the skewed roller brake rings, the diameter of the brake, the angle and depth of the ball socket ramps, and the radius of the ball socket ramps from the center line of the no-back brake.

When it is desired to rotate the ball screw, torque is applied at the gear teeth 42 of the input gear 40. Three conditions are possible at the time the trimming force is applied: trimming in the aiding direction, i.e., turning the ball screw in the same direction as the force induced on it; trimming in the opposing direction, i.e., in the direction opposite the direction of the force applied by the ball screw; and a neutral condition in which the ball screw is not induced to turn in either direction.

In the case of trimming in the aiding direction, the output cam 84 will be twisted by the ball screw relative to the input cam in the same direction that it is desired to turn the input cam and ball screw. The input gear 40 will rotate until the lost motion coupling 60, 62 interengages. At that point, rotary force is transferred through the coupling ring 56 to the input cam 52. The brake gain determines the amount of input torque required for the ball screw to rotate. When the torque applied by the input cam plus the torque applied by the ball screw exceeds the brake force, the brake will slip and the ballscrew will turn, but will be halted by the brake when torque no longer is applied to the input gear.

In the case of trimming in the opposing direction, the other lost motion coupling comes into play. The input gear 40 rotates until its inward extending ribs 41 engage the cooperating projections 43 of the intermediate sleeve 44. This has the effect of rotating the inner sleeve, the ball screw to which the inner sleeve is splined and the output cam 84 which is splined to the inner sleeve. Such rotation of the output cam in the opposing direction releases the brake by rotating the output cam 84 to a position where the balls 96 are centered in their sockets 98. In this case, the only braking force to be overcome is the preload brake force induced by the wave spring 94, but trimming in the opposing direction requires that any opposing force applied by the ball screw itself must be overcome.

The neutral condition is similar to the opposing condition, in that the lost motion coupling including the input gear internal ribs 41 cooperates with the projections 43 of the intermediate gear 44 such that, upon interengagement, the ball screw is driven in the desired direction.

In all three cases, a smooth operation is achieved. The modulating Belleville spring eliminates brake chatter through a wide operating range of speeds and loads, and is particularly important when trimming in the aiding direction. The preload wave spring provides positive braking, which eliminates any substantial axial displacement of the brake components along their splines, reducing fretting wear in addition to promoting smooth operation of the brake. The brake is self-energizing and can provide braking capability proportional to the load applied. Dynamic seals allow the housing to be filled with oil without contamination, thereby increasing the life of the brake and dissipating energy as heat through the oil.

While the preferred embodiment of the invention has been illustrated and described, it will be appreciated that various changes can be made therein without departing from the spirit and scope of the invention. For example, while described with reference to the preferred embodiment of an aircraft horizontal stabilizer trim actuator, the present invention can be used for other applications where a bi-directional no-back brake is desired.

The embodiments of the invention in which an exclusive property or privilege is claimed are defined as follows:

1. A bidirectional no-back brake comprising:

a stationary housing;

an inner, torque-transmitting sleeve extending through the housing;

a cam assembly including an output cam mounted for conjoint rotation with the inner sleeve, an input cam rotatably mounted on the inner sleeve, the input and output cams having cooperating cam surfaces facing each other, and means disposed between the cam surfaces for forcing the input and output cams relatively apart when the output cam rotates relative to the input cam in either direction from a central position;

an input component encircling the inner sleeve for application of torque to rotate the inner sleeve; a first lost motion coupling permitting limited lost motion between the input component and the output cam by way of the inner sleeve; a second lost motion coupling permitting limited lost motion between the input component and the input cam; and a brake assembly located at the side of the input cam opposite the output cam and including stator elements non-rotatable relative to the housing, a rotor element rotatable conjointly with the input cam and brake disc elements fitted between the stator elements and a rotor element, the brake assembly elements being operable to provide increasing braking force when compressed together, and the brake elements being compressed together automatically as a result of the input and output cams being forced apart by rotation of the output cam relative to the input cam from the central position, the braking force of the brake assembly being applied between the housing and the inner sleeve by way of the lost motion couplings, the lost motion couplings being constructed and arranged relatively such that the input and output cams are biased in a direction toward the central position by externally applied rotation of the input component.

2. The no-back brake defined in claim 1, including a preload spring applying a biasing force on the input cam tending to apply a small compressive force on the brake elements for preloading the brake.

3. The no-back brake defined in claim 1, including a modulating spring applying a force tending to move the output cam toward the input cam, in combination with means limiting the maximum movement of the output cam toward the input cam, whereby when the output cam is rotated relative to the input cam from the central position so as to force the output cam and input cam relatively apart, the output cam moves contrary to the biasing force of the modulating spring and the force of the modulating spring is applied through the input cam to the brake elements.

4. The no-back brake defined in claim 1, in which the second lost motor comprising includes a coupling ring rotatable conjointly with the input cam, the coupling ring and the input cam having cooperating projections positioned to allow limited lost motion between the input cam and the coupling ring, and the brake elements being fitted between the coupling ring and the input cam.

5. The no-back brake defined in claim 4, including means limiting movement of the coupling ring away from the input cam, whereby compressive force applied through the input cam as a result of relative turning of the output cam and the input cam is directly applied to the brake elements.

6. The no-back brake defined in claim 1, in which the inner sleeve is splined to a ball screw for conjoint rotation therewith, whereby the no-back brake is operable to apply a braking force to the ball screw.

7. The no-back brake defined in claim 1, in which the housing has a sealed enclosure surrounding the output cam, input cam, and the brake elements.

8. The no-back brake defined in claim 1, in which the sealed enclosure is filled with lubricant.

9. A bidirectional no-back brake comprising:

a stationary housing;

an inner, torque-transmitting sleeve extending through the housing;

a cam assembly including an output cam mounted for conjoint rotation with the inner sleeve, an input cam rotatably mounted on the inner sleeve, the input and output cams having cooperating cam surfaces facing each other, and means disposed between the cam surfaces for forcing the input and output cams relatively apart when the output cam rotates relative to the input cam in either direction from a central position;

an input component encircling the inner sleeve for application of torque to rotate the inner sleeve; a first lost motion copuling permitting limited lost motion between the input component and the output cam by way of the inner sleeve; a second lost motion coupling permitting limited lost motion between the input component and the input cam; and a brake assembly including at least one stator element non-rotatable relative to the housing, at least one rotor element rotatable conjointly with the input cam and at least one brake disc element fitted between the stator element and rotor element, the brake assembly elements being located solely at the side of the input cam opposite the output cam and being operable to provide increasing braking force when compressed together, and the brake elements being compressed together automatically as a result of the input and output cams being forced apart by rotation of the output cam relative to the input cam from the central position, the braking force of the brake assembly being applied between the housing and the inner sleeve by way of the lost motion couplings, the lost motion couplings being constructed and arranged relatively such that the input and output cams are biased in a direction toward the central position by externally applied rotation of the input component.

* * * * *